United States Patent
Andrikowich et al.

(10) Patent No.: US 9,444,308 B2
(45) Date of Patent: Sep. 13, 2016

(54) LINEAR MOTOR COOLING SYSTEM

(75) Inventors: Tom Andrikowich, Whitinsville, MA (US); Matthew D. Graen, Champlin, MN (US)

(73) Assignee: TA INSTRUMENTS-WATERS L.L.C., Milford, MA (US)

( * ) Notice: Subject to any disclaimer, the term of this patent is extended or adjusted under 35 U.S.C. 154(b) by 0 days.

(21) Appl. No.: 13/339,786

(22) Filed: Dec. 29, 2011

(65) Prior Publication Data

US 2013/0169079 A1 Jul. 4, 2013

(51) Int. Cl.
*H02K 9/04* (2006.01)

(52) U.S. Cl.
CPC ........................ *H02K 9/04* (2013.01)

(58) Field of Classification Search
CPC ........................................................ H02K 9/04
USPC ...... 310/12.15, 156.32, 156.42, 33, 22, 264, 310/126, 131, 347, 12, 29, 349, 49.42, 310/49.47, 58, 122, 112, 12.14, 12.29, 52, 310/59
IPC ........................................................ H02K 9/04
See application file for complete search history.

(56) References Cited

U.S. PATENT DOCUMENTS

| | | | | |
|---|---|---|---|---|
| 3,394,295 A * | 7/1968 | Cory | ...................... | H02K 21/16 310/12.14 |
| 3,809,990 A * | 5/1974 | Kuo et al. | ...................... | 318/696 |
| 4,945,296 A * | 7/1990 | Satake | ...................... | 318/538 |
| 4,992,687 A * | 2/1991 | Nel | ...................... | 310/68 D |
| 5,925,963 A * | 7/1999 | Yang | ...................... | H02K 1/146 310/154.21 |
| 6,114,781 A | 9/2000 | Hazelton et al. | | |
| 6,661,130 B2 * | 12/2003 | Yamazaki | ...................... | H02K 41/031 310/12.14 |
| 6,700,235 B1 * | 3/2004 | McAfee | ...................... | H02K 9/06 310/52 |
| 6,825,580 B2 * | 11/2004 | Hwang | ...................... | H02K 41/03 310/12.29 |
| 6,927,509 B2 * | 8/2005 | Cichetti, Sr. | ...................... | 310/52 |
| 7,259,486 B2 * | 8/2007 | Yamamoto | ...................... | 310/90 |
| 7,821,169 B2 * | 10/2010 | Okazaki et al. | ......... | 310/156.36 |
| 8,330,307 B2 * | 12/2012 | Nagasaka | ............... | H02K 41/03 310/12.21 |
| 2004/0189111 A1 * | 9/2004 | Cichetti, Sr. | ...................... | 310/58 |
| 2006/0226718 A1 * | 10/2006 | Yang | ........................ | H02K 1/20 310/59 |
| 2006/0250039 A1 * | 11/2006 | Yamamoto | ...................... | 310/90 |
| 2007/0007837 A1 * | 1/2007 | Mukai et al. | ................. | 310/112 |
| 2007/0007847 A1 * | 1/2007 | Maekawa et al. | ............ | 310/263 |

(Continued)

FOREIGN PATENT DOCUMENTS

JP S63283460 A 11/1988
JP H02-97266 A 4/1990

(Continued)

OTHER PUBLICATIONS

Hamid et al, "Handbook of Electric Motors", Marcel and Dekker Co., p. 558, 2004.*

(Continued)

*Primary Examiner* — John K Kim
(74) *Attorney, Agent, or Firm* — McCarter & English, LLP; Deborah M. Vernon

(57) ABSTRACT

An apparatus includes an electric machine. The electric machine includes an internal housing, an armature coil disposed within the internal housing and separated from the internal housing by a gap, and a magnetic core associated with the armature coil. The apparatus also includes a fan configured to cause air to flow in the gap between the armature coil and the internal housing.

17 Claims, 5 Drawing Sheets

(56) References Cited

U.S. PATENT DOCUMENTS

| | | | |
|---|---|---|---|
| 2007/0046112 A1* | 3/2007 | Uehara et al. | 310/58 |
| 2007/0057584 A1* | 3/2007 | Takahashi | 310/68 D |
| 2007/0063593 A1* | 3/2007 | Braun et al. | 310/58 |
| 2007/0278864 A1 | 12/2007 | Lai et al. | |
| 2009/0058374 A1* | 3/2009 | Evans et al. | 322/28 |
| 2010/0181848 A1 | 7/2010 | Nagasaka | |

FOREIGN PATENT DOCUMENTS

| JP | H05-336703 A | 12/1993 |
|---|---|---|
| JP | H08-280167 A | 10/1996 |

OTHER PUBLICATIONS

Warhaft, "Transition and Turbulence", a section adapted from The Engine and the Atmosphere: An Introduction to Engineering, Cambridge University Press, 1997.*

\* cited by examiner

LINEAR MOTOR COOLING SYSTEM

BACKGROUND

A linear motor is an electric motor that generates a linear force along its length. The operation of such motors generates a significant amount of heat. Because many of the components of a linear motor, including, in particular, the armature coils and associated magnetic cores, are sensitive to temperature, cooling systems are provided to avoid a deterioration in motor performance.

Referring to FIG. 1, one approach to cooling a linear motor 100 is to place a heat sink 102 on either side of the motor. Heat generated during the operation of motor 100 is removed by conduction into heat sink 102. A fan bank 104 cools heat sink 102, thus dispersing the heat into the surrounding atmosphere and cooling motor 100.

SUMMARY

In a general aspect, an apparatus includes an electric machine. The electric machine includes an internal housing, an armature coil disposed within the internal housing and separated from the internal housing by a gap, and a magnetic core associated with the armature coil. The apparatus also includes a fan configured to cause air to flow in the gap between the armature coil and the internal housing.

Embodiments may include one or more of the following.

The air flow in the gap causes cooling of at least one of the armature coil and the magnetic core.

The fan is configured to blow air directly across the armature coil

The apparatus further includes a plurality of fans. An arrangement of the plurality of fans is determined to maximize at least one of flow velocity through the electric machine and heat transfer between the air and the armature coil.

The fan is configured to cause turbulent air flow in the gap.

A size of the gap is selected to cause turbulent air flow in the gap. A size of the gap is selected to maximize heat transfer between the air and the armature coil.

The armature coil is a first armature coil and the magnetic core is a first magnetic core; and further comprising: a second armature coil adjacent to the first armature coil, the first armature coil separated from the second armature coil by a first coil gap; and a second magnetic core associated with the second armature coil. The fan is configured to cause air to flow in the first coil gap.

The apparatus further includes a third armature coil; and a fourth armature coil adjacent to the third armature coil, the third armature coil separated from the fourth armature coil by a second coil gap. The fan is configured to cause air to flow in the second coil gap.

The electric machine is an electromagnetic motor.

The apparatus further includes an inlet port is disposed on a first end of the electric machine, the fan disposed in the inlet port; and an exhaust port disposed on a second end of the electric machine opposite the inlet port.

In another general aspect, a method includes providing an electric machine. The electric machine includes an internal housing, an armature coil disposed within the internal housing and separated from the internal housing by a gap, and a magnetic core associated with the armature coil. The method further includes causing air to flow in the gap between the armature coil and the internal housing.

Embodiments may include one or more of the following.

Causing air to flow in the gap causes cooling of at least one of the armature coil and the magnetic core. Causing air to flow in the gap comprises blowing air directly across the armature coil. Causing air to flow in the gap causes turbulent air flow in the gap.

The method further includes determining a size of the gap in order to cause turbulent air flow in the gap. The method further includes determining a size of the gap in order to maximize heat transfer between the air and the armature coil.

Among other advantages, the systems described herein have fewer parts and are less complex than conventional motor cooling systems and thus can be implemented for lower cost. Gaps between armature coils within the motor allow for high cooling efficiency without compromising motor performance, such as the output force of the motor. The ability to cool the motor more efficiently allows the motor to be fabricated with conventional, lower cost lamination steel rather than higher grade steel, thus further reducing the fabrication cost of the motor.

Other features and advantages of the invention are apparent from the following description and from the claims.

DETAILED DESCRIPTION

Figure 1:
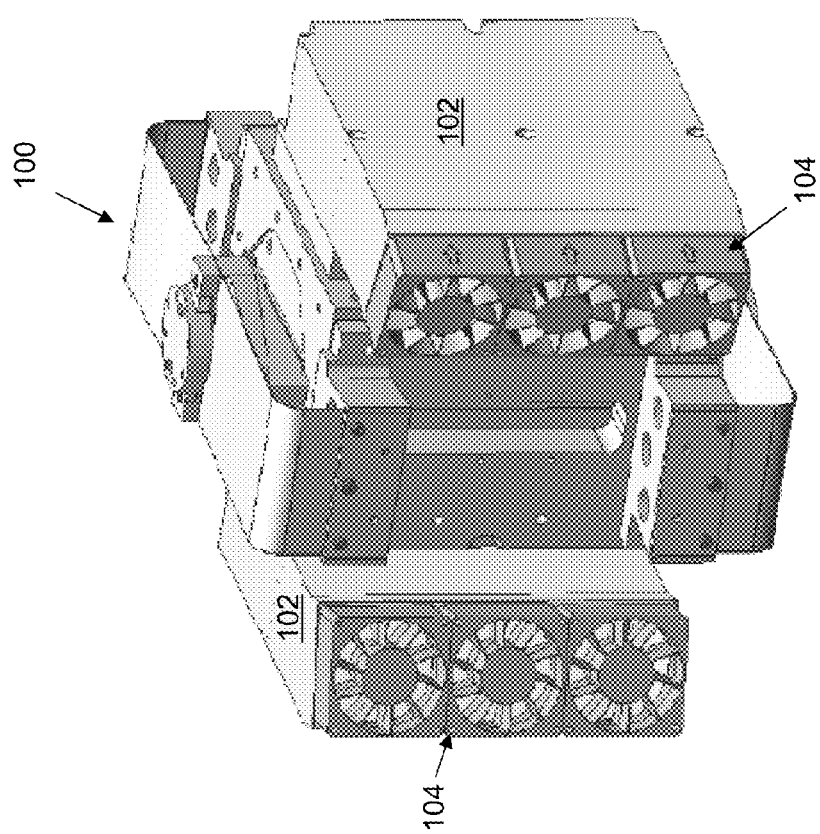
FIG. 1 is a diagram of a prior art motor.
Figures 2, 3:
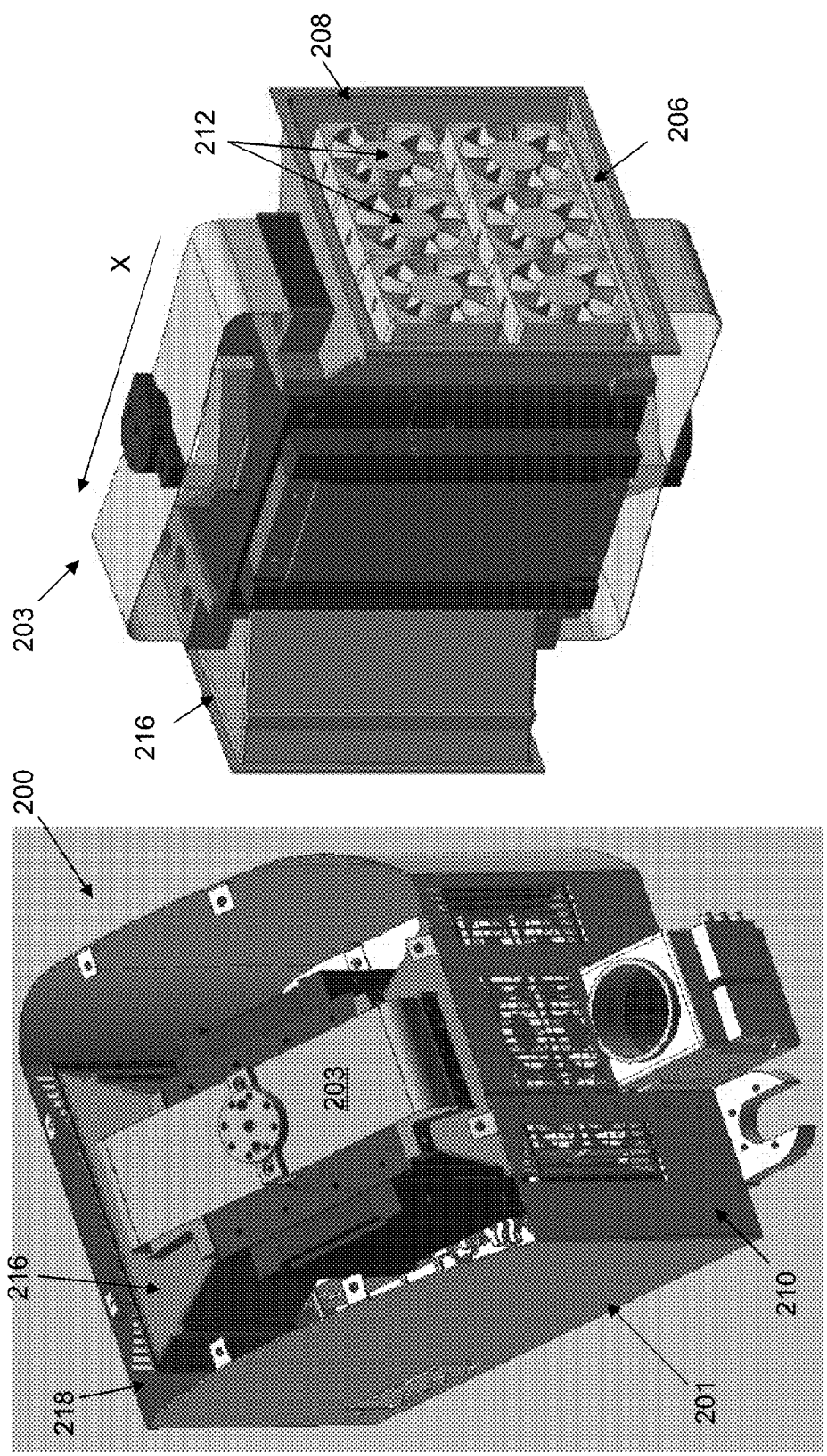
FIG. 2 is a diagram of a motor cooled by forced air cooling.
FIG. 3 is a diagram of internal components of the motor of FIG. 2.
Figure 4A:
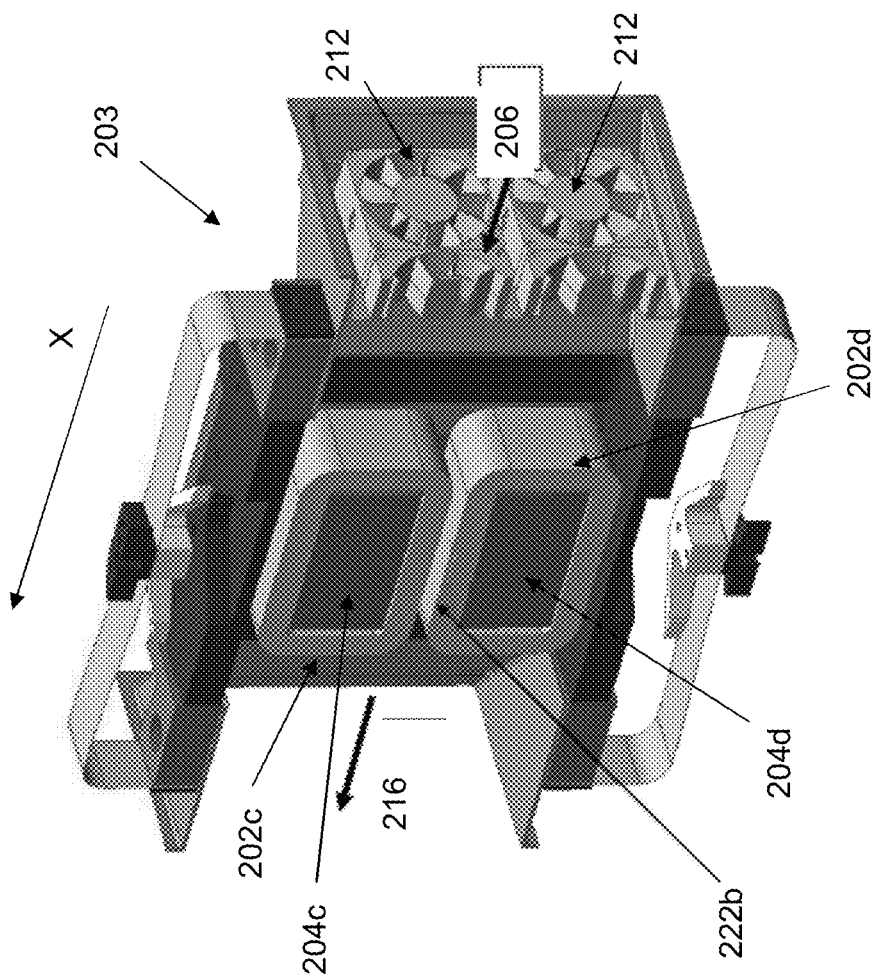
FIG. 4A is a cut-away perspective view of the internal components of FIG. 3.
Figure 4B:
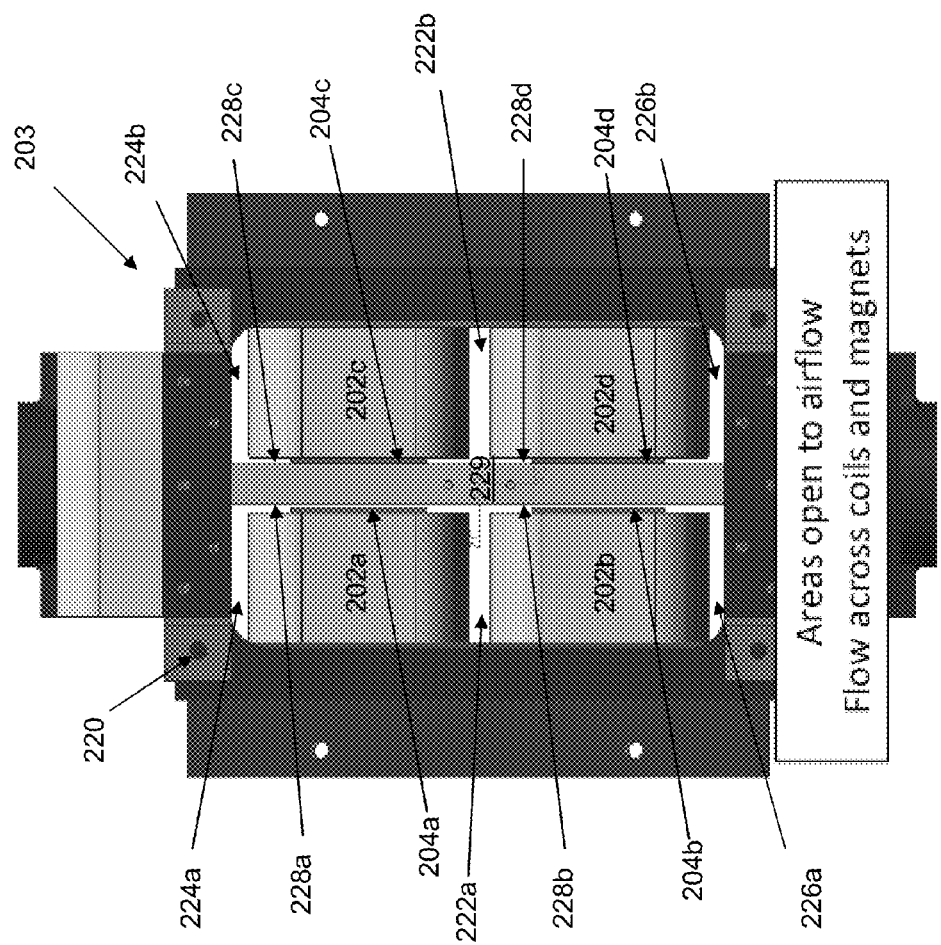
FIG. 4B is a cut-away front view of the internal components of FIG. 3.
Figure 4C:
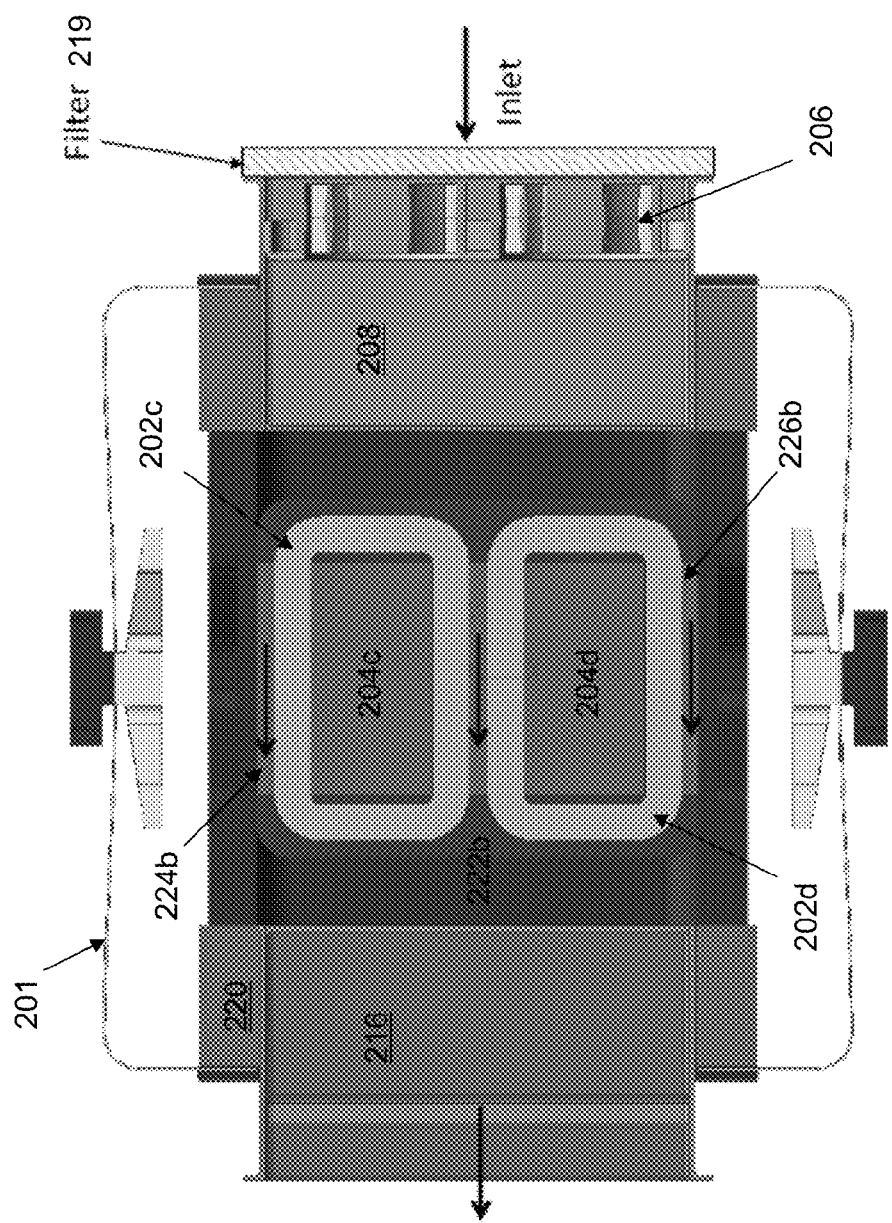
FIG. 4C is a cut-away side view of the internal components of FIG. 3.

Referring to FIGS. 2 and 3, a linear motor 200 outputs a linear force along its length (denoted as the x-axis). Motor 200 is formed of an external housing 201 which houses an internal body 203. Referring also to FIGS. 4A-4C, the internal body 203 includes four armature coils 202a, 202b, 202c, 202d, each with an associated magnetic core 204a, 204b, 204c, 204d, respectively. In operation, motor 200 generates a significant amount of heat, primarily from current flowing through the armature coils 202. The performance of the motor components, and in particular the magnetic cores 204, decreases with increasing motor temperature.

A forced air, convection cooling system is employed to dissipate the heat generated by motor 200. In particular, a fan bank 206 is positioned at an inlet 208 on a front face 210 of the motor. Fan bank 206 includes one or more fans 212 that blow air directly into the interior of motor 200. The air flow is generally along the length of armature coils 202 (i.e., along the x-axis) and serves to cool the armature coils and associated magnetic cores 204. Motor 200 is designed with a straight flow-through design in which flow restrictions, such as turns, bends, or large changes in cross-sectional area, are minimized. This unobstructed design allows air to flow through the motor at high velocity, which provides a high heat transfer coefficient between the air and the motor components. The air exits the motor via an exhaust port 216 on a rear face 218 of the motor. In some embodiments, a filter 219 is positioned at inlet 208 prior to fan bank 206 and serves to filter the air that is drawn into the motor, thus avoiding contamination of the motor components.

In the interior of motor 200, open space is provided to facilitate air flow across armature coils 202 and magnetic cores 204. Gaps 222-228 adjacent to the armature coils 202 allow a large fraction of the surface area of the armature coils to be exposed to the circulating air, facilitating heat transfer from the coils to the air. In particular, a central gap 222a separates armature coils 202a and 202b, and a central gap 222b separates armature coils 202c and 202d. Upper gaps 224a and 224b separate armature coils 202a and 202c, respectively, from the top of an internal housing 220. Lower gaps 226a and 226b separate armature coils 202b and 202d, respectively, from the bottom of housing 220. Side gaps 228a, 228b, 228c, and 228d separate armature coils 202a, 202b, 202c, and 202d, respectively, from a central support core 229 of the housing 220.

High velocity air flow enhances the heat transfer coefficient between the armature coils 202 and the circulating air. The volume of space available for air flow (i.e., the size and geometry of the gaps) affects the system impedance to air flow and thus influences the velocity of the air passing through the motor. The air flow velocity is also dependent upon the performance of fan bank 206, as well as on environmental factors such as temperature and air density.

The heat transfer coefficient is maximized for turbulent air flow through the motor. Turbulent air flow can be achieved by causing air of sufficiently high velocity to flow in gaps 222-228, which is effected by optimizing the fan arrangement and performance and the gap geometry. However, cost and manufacturing considerations dictate that a motor of smaller volume and with a minimum number of fans is desirable. Thus, in practice, the gap geometry and fan arrangement are determined via an iterative process which aims to both maximize the heat transfer coefficient and minimize manufacturing cost. The amount of heat dissipated by the armature coils 202 is generally known. Factors such as the maximum allowable operating temperature of the armature coils 202 and magnets 204, the properties of the fluid (i.e., the circulating air) at the operating temperature, the airflow impedance of the motor, the fan performance curves, and the fan arrangement and cost are used as parameters in a model of the motor and cooling system. The design of the motor is determined to optimize the performance of the cooling system.

As an example, given the heat dissipation by the armature coils 202, the maximum ambient temperature, and an understanding of the temperature limitations of the coils and magnets, the heat transfer coefficient that is sufficient to limit the temperatures of sensitive motor components can be calculated. Because the heat transfer coefficient is a function of the properties of the fluid, the flow velocity, and the flow geometry, it is possible to iterate a motor design in order to optimize the design for performance and cost. For instance, reducing the gap between the coils increases the impedance of the motor to air flow; to compensate for the increased impedance, the fan performance is increased to produce sufficient velocity to achieve the desired heat transfer coefficient. A larger gap between the coils will lower the air flow impedance but generally necessitates higher air flow rates to obtain the desired heat transfer coefficient. Thus, in general, an iterative process using motor impedance (i.e., geometry and/or gap size), fan performance, and cost as variables is employed to optimize the design of the motor.

As an example, a motor designed based on such an iterative process produces 7.5 kN of force output and dissipates about 1.8 kW of heat through its four armature coils, or 450 Watts per coil. The gaps above and between the coils are 10 mm. The motor has external dimensions of 44.5 cm×27.2 cm×43.7 cm and weighs approximately 95 kg.

The arrangement of gaps 222-228 is also subject to maintaining suitable magnetic performance of the motor components. In a conventional motor with no gaps between the armature coils, the magnet transition line (i.e., the N-to-S magnetic orientation change) is aligned with the centers of the pole faces. In a motor with gaps between the coils, this alignment of the magnet transition line is maintained. Furthermore, the inclusion of the gaps between the armature coils increases the distance between the poles but continues to keep the magnetic transition distance aligned with the pole face centers.

It is to be understood that the foregoing description is intended to illustrate and not to limit the scope of the invention, which is defined by the scope of the appended claims. Other embodiments are within the scope of the following claims.

What is claimed is:

1. An apparatus comprising:
   a linear motor disposed to generate a linear force, the linear motor including:
   an armature coil disposed within an internal housing, a magnetic core associated with the armature coil, an upper gap separating the armature coil from a top of the internal housing, a lower gap separating the armature coil from a bottom of the internal housing, and side gaps separating the armature coil from the internal housing; and
   a fan configured to cause air to flow in the upper gap, the lower gap, and side gaps, along a length of the armature coil in a direction parallel to the linear force, wherein the armature coil is a first armature coil and the magnetic core is a first magnetic core, the apparatus further comprising:
   a second armature coil adjacent to the first armature coil, the first armature coil separated from the second armature coil by a first coil gap;
   a second magnetic core associated with the second armature coil, wherein the fan is configured to cause air to flow in the first coil gap, wherein a size of the upper gap, the side gaps and the lower gap are selected to cause turbulent air flow in the upper gap, the lower gap, and side gaps; and
   a central support core extending from the top of the internal housing to the bottom of the internal housing.

2. The apparatus of claim 1, wherein the air flow in the upper gap, the lower gap, and side gaps causes cooling of the armature coil and the magnetic core.

3. The apparatus of claim 1, wherein the fan is configured to blow air directly across the armature coil and magnetic core.

4. The apparatus of claim 1, further comprising a plurality of fans.

5. The apparatus of claim 4, wherein an arrangement of the plurality of fans is determined to maximize at least one of flow velocity through the internal housing and heat transfer between the air, the armature coil and the magnetic core.

6. The apparatus of claim 1, wherein the fan is configured to cause turbulent air flow in the upper gap, the lower gap, and side gaps.

7. The apparatus of claim 1, wherein a size of the upper gap, a size of the lower gap, and a size of the side gaps are selected to maximize heat transfer between the air, the armature coil and the magnetic core.

8. The apparatus of claim 1, further comprising:
a third armature coil; and
a fourth armature coil adjacent to the third armature coil, the third armature coil separated from the fourth armature coil by a second coil gap.

9. The apparatus of claim 8, wherein the fan is configured to cause air to flow in the second coil gap.

10. The apparatus of claim 1, wherein the linear motor is an electromagnetic motor.

11. The apparatus of claim 1, further comprising:
an inlet port is disposed on a first end of the linear motor, the fan disposed in the inlet port; and
an exhaust port disposed on a second end of the linear motor opposite the inlet port.

12. A method comprising:
providing a linear motor disposed to generate a linear force, the linear motor comprising:
an armature coil disposed within an internal housing, a magnetic core associated with the armature coil, an upper gap separating the armature coil from a top of the internal housing, a lower gap separating the armature coil from a bottom of the internal housing, and side gaps separating the armature coil from the internal housing; and
causing air to flow in the upper gap, the lower gap, and side gaps, along a length of the armature coil in a direction parallel to the linear force, wherein the armature coil is a first armature coil and the magnetic core is a first magnetic core, the linear motor further comprising:

a second armature coil adjacent to the first armature coil, the first armature coil separated from the second armature coil by a first coil gap;
a second magnetic core associated with the second armature coil, wherein the causing step also causes air to flow in the first coil gap, wherein a size of the upper gap and a size of the lower gap are selected to cause turbulent air flow in the upper gap, the lower gap, and side gaps; and
a central support core extending from the top of the internal housing to the bottom of the internal housing.

13. The method of claim 12, wherein causing air to flow in the upper gap, the lower gap, and side gaps causes cooling of at least one of the armature coil and the magnetic core.

14. The method of claim 12, wherein causing air to flow in the upper gap, the lower gap, and side gaps comprises blowing air directly across the armature coil and the magnetic core.

15. The method of claim 12, wherein causing air to flow in the upper gap, the lower gap, and side gaps causes turbulent air flow in the upper gap, the lower gap, and side gaps.

16. The method of claim 12, further comprising determining a size of the upper gap, the lower gap, and side gaps in order to cause turbulent air flow in the upper gap, the lower gap, and side gaps.

17. The method of claim 12, further comprising determining a size of the upper gap, the lower gap, and side gaps in order to maximize heat transfer between the air, the armature coil and the magnetic core.

* * * * *